United States Patent [19]

Nakamura

[11] 4,371,898
[45] Feb. 1, 1983

[54] COMPOSITE INFORMATION RECORDING APPARATUS

[75] Inventor: Hiroya Nakamura, Hachioji, Japan

[73] Assignee: Konishiroku Photo Industry Co., Ltd., Tokyo, Japan

[21] Appl. No.: 154,148

[22] Filed: May 28, 1980

[30] Foreign Application Priority Data

May 31, 1979 [JP] Japan .................................. 54-66854
Oct. 31, 1979 [JP] Japan ................................ 54-139940

[51] Int. Cl.³ ............................................ H04N 1/22
[52] U.S. Cl. ........................................ 358/300; 355/7
[58] Field of Search ................ 360/33; 358/127, 300, 358/296, 183, 903, 293; 355/7, 40, 41; 340/709

[56] References Cited

U.S. PATENT DOCUMENTS 3,537,096 10/1970 Hatfield .............................. 340/725
3,753,240 8/1973 Merwin .............................. 364/200
4,107,741 8/1978 Lemelson ........................... 358/300
4,178,613 12/1979 Takahoshi .......................... 358/127
4,268,164 5/1981 Yojima et al. ...................... 355/7

Primary Examiner—Bernard Konick
Assistant Examiner—Alan Faber
Attorney, Agent, or Firm—Linda G. Bierman; Jordan B. Bierman

[57] ABSTRACT

A composite information recording apparatus for recording on a recording sheet a composite image of an original and variable information as separate but substantially contiguous portions of the same recording sheet without overlap therebetween includes a copy board for supporting an original, a row of illuminating elements along an edge of the copy board portion at which the original is supported, and a data input device for entering variable information, such that after said entry of the variable information appropriate ones of the illuminating elements are lit to designate the position of the copy board portion at which the original should be placed for composite reproduction in order to avoid overlap with the variable information. In a second embodiment, sliders movable along an edge of the copy board original supporting portion are adjustable to indicate the position of the original thereon and to designate at the data input device the available area of the recording sheet into which variable information may then be entered.

4 Claims, 10 Drawing Figures

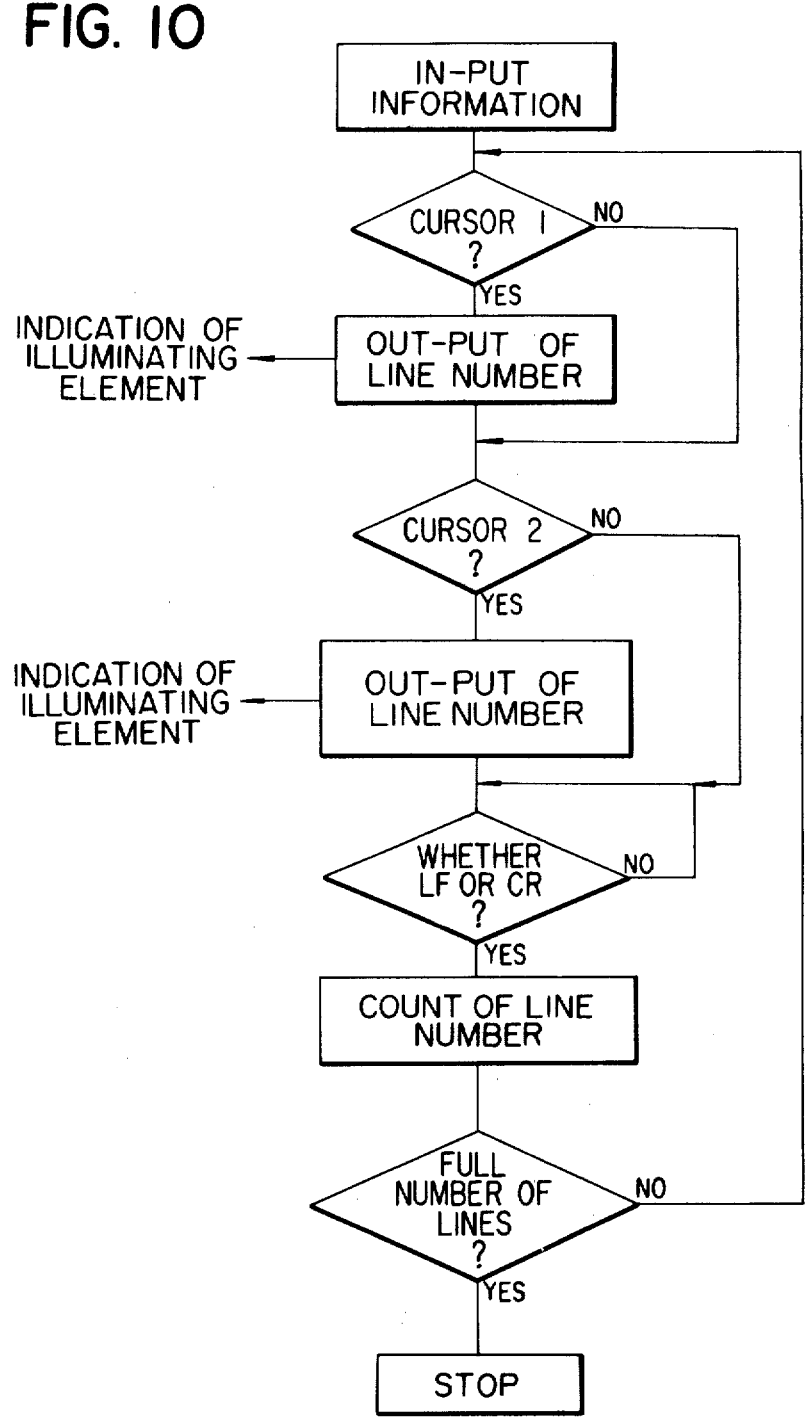

COMPOSITE INFORMATION RECORDING APPARATUS

BACKGROUND OF THE INVENTION

The present invention relates to a composite recording apparatus, more particularly, to an apparatus and, capable of designating a position at which an image of an original (referred to also as the original image) to be recorded or copied is inserted onto the display device or an area in the vicinity of a copy board.

In recent years, there has been developed a system in which an external information source such as an output printer of a computer or like information source is combined with an electrophotographic copying apparatus to thereby supply external information to the copying apparatus in the form of an electric signal, whereby the electric signal is reproduced as an electrostatic latent image on a light sensitive (photoconductive) medium through a scanning reproducing means such as an optical fiber tube provided in the copying apparatus. The electrostatic latent image is then recorded on a recording sheet such as, for example, a transfer sheet of plain paper as a visible image after electrophotographic processing, whereby a composite image is obtained which includes in a suitable combination an image of an original reproduced through conventional exposure and development techniques and the image reproduced from the external information in the manner described above.

For preparing a composite image in the composite information recording apparatus, the image to be reproduced from external information and the original image have to be preparatorily edited on a display device such as a CRT tube to prepare a text of the composite image information. By way of example, it is assumed that an original image A (i.e. an image of an original) is to be arrayed at a middle portion of a recording sheet 1 while statement information B and C for elucidating the original image A are positioned above and below the image information, as is illustrated in FIG. 1. According to a hitherto known technique, operator OP (FIG. 2) first prepares the statement information with the aid of a keyboard 2, stores that information in an internal memory, and at the same time displays the information as an image B' on a display device 3 for editing text. Next, the operator prepares the statement information C with the aid of the keyboard 2 and stores it in the internal memory while an area A' allotted for insertion of the original image A is left blank on the display device 3. The statement information C thus prepared is also displayed as an image C' on the display device. For providing the area A' for the original image, the operator has to read the width of the original from the position of sliders or wipers 4b relative to a scale 4c provided in the vicinity of copy board 4a and perform a line-feeding operation in the keyboard 2 for the number of lines corresponding to the area A'. The sliders 4b are previously fixedly positioned in accordance with the width of the original 5 disposed on the copy board 4a of the composite information recording apparatus. With the boundary between the original image A and the statement information B on the recording sheet 1 represented by $P_1$ and the boundary between the original image A and the statement information C being represented by $P_2$, it should be mentioned that great difficulty has been heretofore encountered in determining the boundaries $P_1$ and $P_2$ on the display device 3 when editing the text.

This is particularly the case where the external information image and the original image are to be arrayed in a complicated composition, in that a very troublesome procedure is required for determining the boundaries between the discrete images, resulting in reduced efficiency in the text editing procedure.

A general arrangement of a typical composite information recording apparatus as understood is shown in FIG. 6. Referring to this figure, the recording apparatus denoted generally by reference numeral 20 includes a copy board 21 adapted to support thereon an original such as a document and to be reciprocally moved over a main body of the recording apparatus 20, an exposure lamp assembly 22 for illuminating an original M disposed on the copy board 21, and an optical system which is composed of a first mirror 23, a lens 24, and a second mirror 25 for leading reflected light from the original M to a light-sensitive drum 26, to thereby project an image of the original on a light-sensitive layer 26a such as of selemium disposed around the periphery of the drum 26. A mechanical shutter 27 is disposed in an optical path of the optical system and is adapted to open or interrupt the optical path through operation of actuator means 28 provided with a solenoid. On the other hand, disposed around the light-sensitive drum 26 are a charging device 29, a developing device 30, a transfer electrode 31, a separating electrode 32, a charge removing electrode 33 and a cleaning device 34, successively, and additionally a scanning reproducing means 35 which is disposed upstream of the developing device 30 as viewed in the rotating direction of the drum 26 and adapted to convert external information supplied in the form of an electric signal into an optical image which is then projected onto the light-sensitive layer 26a. Such scanning reproducing means 35 may be composed of an optical fiber tube, a thin wall tube, a laser ray scanner device or the like. Reference numeral 36 denotes a recording sheet tray for accommodating therein a stack of recording sheets K, 37 designates a transporting system for transporting recording sheets K after the image transfer has been made, 38 designates a fixing device for fixing a composite image transferred onto the recording sheet, and, finally, the numeral 39 denotes an exit tray for receiving thereon the recording sheets K having the fixed composite image.

When a composite image is to be produced with the aid of the composite information recording apparatus described above, the external information to be combined with the information of the original or document is usually supplied from an input device such as a word processor, keyboard or the like, whereby addition of the composite image to be produced is preparatorily effected using a display device for editing. For editing the composite image, a display device 40 and a keyboard 41 such as shown in FIG. 7 may be used. More specifically, the external information signals representing characters, symbols or the like are loaded by correspondingly manipulating keys or buttons 42a of the keyboard 41 by an operator. The input information is then displayed on a display screen 40a of the display device 40 on a line-by-line base. At that time, a bright spot mark M (usually referred to as a cursor) is produced on the display screen 40a at one side thereof for indicating a position for the information to be next input. Assuming that a composite image is to be constituted by inserting document information A available from the original between the information B and C to be loaded with the aid of the keyboard 41, then the editing procedure is performed in the manner described below. At first, the information B is loaded through corresponding operation of the keyboard 41. Next, the cursor M (P₁) located at the end position P₁ of the information B is shifted downwardly by a number of lines which corresponds to the height of the original or document image A, whereby the cursor is now located at position P₂. Subsequently, the keyboard 41 is again operated to load the information C. Alternatively, the information B and C may be successively loaded and thereafter the cursor M (P₁) placed between the information area B and the information area C, to thereby shift the information area C downwardly by a number of lines corresponding to the height of the document or original image. In this manner, the text for a single composite image is prepared on the display screen 40a of the display device 40, whereby the composition as well as contents of the composite image can be previously confirmed. In this conjunction, it should however be noted that there is no association or relation between the position of the cursor displayed on the text and the actual operation for designating or setting the location for the document. In other words, in this composite information recording apparatus, designation of the location for the document has relied on manual setting of position designating sliders SL₁ and SL₂ in FIG. 6 (corresponding to sliders 4b in FIG. 2) at the boundaries of the original or document which are estimatingly determined through calculation of the area to be allotted for the document image (i.e. the number of lines multiplied by an inter-line spacing) independently of the position of the cursor in the text for addition.

SUMMARY OF THE INVENTION

In light of the technical background outlined above, it is contemplated in the invention to associate the text for addition with the actual document position designating procedure. More specifically, it is intended to designate the position of an original or document in a facilitated manner with a high reliability upon recording of a composite information image by displaying the position of the original directly on the copy board making use of the cursor display signal on the text.

In view of the inconvenience of the original position determining system described above, it is contemplated with the present invention to display automatically the boundary positions on the display device and thereby facilitate the text editing procedure. To this end, it is proposed according to a general aspect of the invention that at least two electric signals representing position of an original be produced and converted into corresponding digital quantities to be displayed on a composite image visualizing device after arithmetic operations as required have been executed on the digital quantities.

The present invention will become more apparent from the following detailed description of a preferred embodiment taken in conjunction with the accompanying drawings.

BRIEF DESCRIPTION OF THE DRAWINGS

In the accompanying drawings,

FIG. 10 is a flow chart to illustrate the original inserting position indicating operations.

DETAILED DESCRIPTION OF THE PREFERRED EMBODIMENTS

Figure 8:
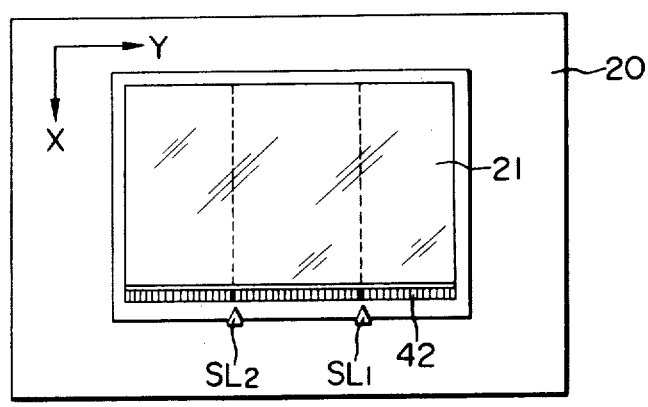
FIG. 8 shows a copy board provided with an original inserting position designating display according to an embodiment of the invention.
Figure 9:
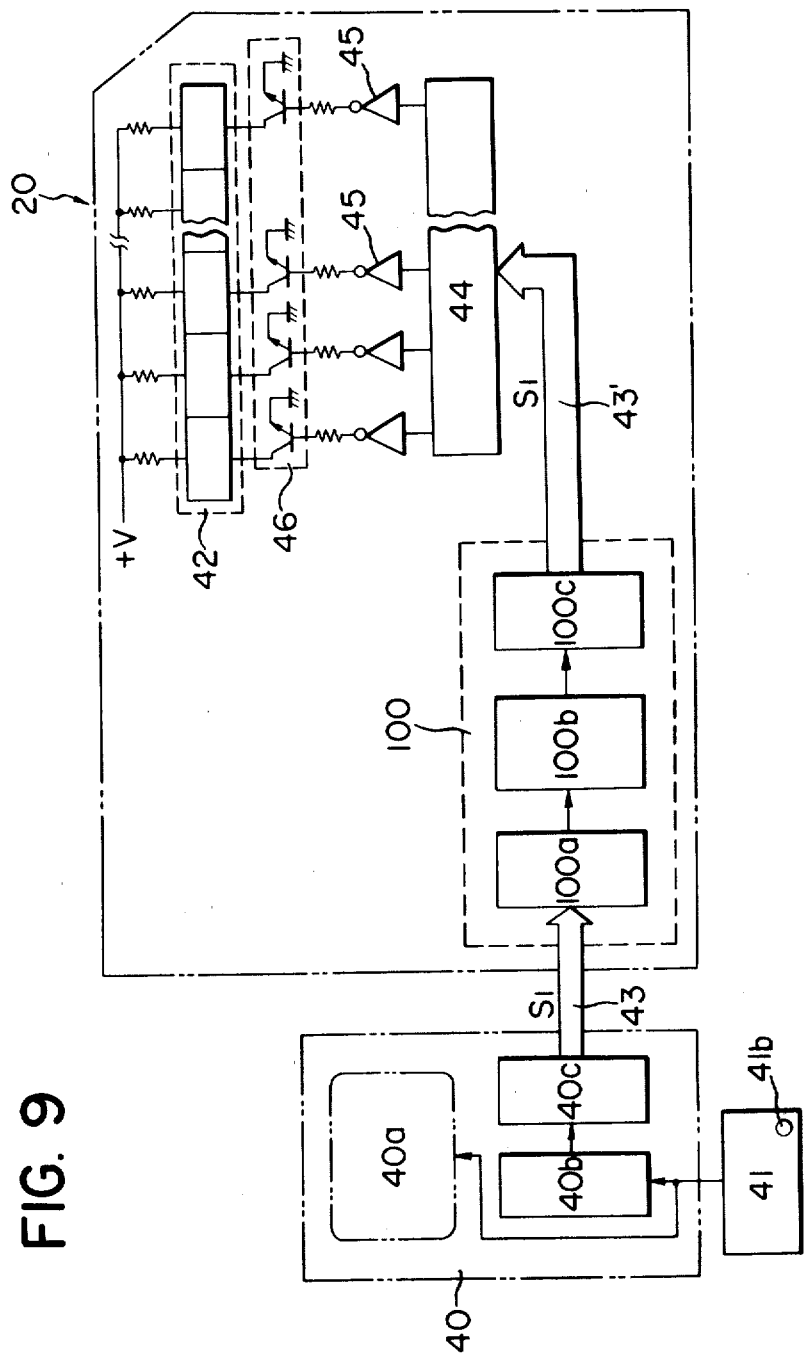
FIG. 9 is a circuit diagram of a driving circuit for operating the original inserting position designating display shown in FIG. 8.

In FIGS. 8 and 9, an original or document position display 42 is disposed on the original carriage 21 of the recording apparatus 20 along a side thereof in the original or document scanning direction, as is shown in FIG. 8. The original position display 42 is constituted by a number of display elements such as light emitting diodes or liquid display segments arrayed in a line, wherein individual display elements are adapted to emit light, or vary light transmission or the reflection factor separately from one another to thereby produce overall visual display. In this connection, it is preferred that the number of the display elements constituting the original position display 42 should be selected equal to the number (n) of lines of an information image displayed on the display screen 40a of the display device 40 for addition. Referring to FIG. 9, the same shows a driver circuit for the original position display 42 based on the assumption that the latter is constituted by n light emitting elements. When information to be recorded (e.g. information B) is input through corresponding manipulation of the keyboard 41 by an operator, the input information B is displayed on the display screen 40a of the CRT display device 40 and at the same time encoded by an encoder 40b and transmitted to a micro-computer-controller 100 incorporated in the recording apparatus 20 through an input/output communication interface (USART) 40c and a data bus 43. In the micro-computer-controller 100, the input information is supplied to a central processing unit (CPU) 100b provided with a memory through an input/output communication interface (USART) 100a. When an original inserting position designating button 41b on the keyboard 41 is pushed by the operator at the termination of the input information, an original inserting position designating signal S₁ is transmitted to the CPU 100b in the same manner as in the case of the transmission of information B described above. The original inserting position designating signal S₁ is further supplied to a decoder 44 through an input/output (I/O) port 100c. The coded position designating signal S₁ is decoded by the decoder 44 and is used for energizing the corresponding light emitting element of the display 42 through an associated inverter 45 and driver 46. In this manner, one of the original inserting positions is indicated by the display 42 disposed along one side of the copy board. Next, the operator shifts the cursor downwardly by a distance corresponding to the number of lines of the document information image A to be inserted while monitoring the display screen 40a of the CRT display device 40. When the original inserting position designating button 41b of the keyboard 41 is pushed again, a corresponding light emitting element of the display 42 is energized in the same manner as described above.

FIG. 10 shows a flow chart to illustrate arithmetic operations executed by the CPU 100b for determining the two original inserting positions to be indicated by the display 42 from the input information supplied to the micro-computer-controller 100. In this flow chart, the term "cursor 1" delineates the cursor being located at the position at which the insertion of the document or original information A is initiated, while the term "cursor 2" means the cursor located at the position at which the insertion of the original information A is to be terminated. The symbols "LF" and "CR" indicate the line feed operation and the carriage return operation, respectively, effected with the aid of the keyboard 41.

Thus, as seen in the flow chart of FIG. 10, information input through display device 40 is tested as entered. When the first block or segment of information is complete, a position designating button 41b is actuated to transmit a signal $S_1$ whereby a line number with respect to the top of the display screen (and counted in accordance with preceding LF and CR signals) causes at least a corresponding one of the light emitting elements 42 to be illuminated (at position P1). When button 41b is subsequently again actuated, an indication of position P2 is provided at the appropriate light emitting element 42. After a predetermined number of lines of text data have been entered, transmission of textual data is complete since the page is then full.

The light emitting elements remain in the energized state so long as the text for addition is displayed on the screen 40a of the CRT display device 40. When the operator manipulates the keyboard 41 to input the external information C, text for editing the composite image composed of the information A, B and C has now been prepared. In this manner, the original or document position designating procedure is extremely facilitated, since the only required procedure is to place the document or original between the positions indicated by light emission on the display 42 provided along one side of the original carriage 21. When the document is of a large size so that it extends beyond the area defined by the original inserting position designating points, then only that portion of the information which falls within the area defined between the designating points is inserted as the document information A between the external information B and C.

In the case of the exemplary embodiment described above, it has been assumed that the position at which an original or document information is to be inserted is designated by two light emitting elements indicating the boundaries of the external information (B and C). However, it is self-explanatory that all of the light emitting elements which cover the inserting area may be energized to thereby produce a continuous bar-like display. As the alternative, only the boundary between the external information B and the document information A may be indicated by the energized light emitting element, while the boundary between the document information A and the external information C may be manually set by the operator by means of the slider $SL_2$ provided at one side of the copy board. In this case, it be preferred that the position of the slider $SL_2$ is converted into an electric signal which is then transmitted to the CRT display device 40 to display the position of the slider $SL_2$ as the cursor on the screen 40a of the display device 40.

Figure 7:
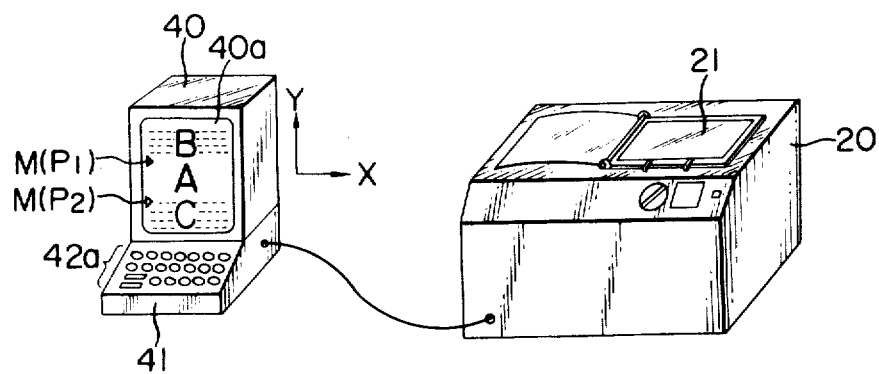
FIG. 7 illustrates an editing procedure for recording a composite image.

Since the cursor M displayed on the CRT display device upon addition of text is adapted to be displaced in the X-direction a display such as that designated 42 may be additionally provided on the original carriage 21 in the widthwise direction perpendicularly to the display 42, thereby to allow the cursor position to be indicated correspondingly on the additional display when required in the addition of text. In this last case, the location displayed by the light emitting elements corresponds to an unwanted area to be masked in the X-direction of the original (FIGS. 7 and 8). Thus, the masking can be performed in a much facilitated manner.

As will be appreciated from the foregoing description, according to the invention it is possible to indicate the original inserting position and additionally the masking location directly on the original carriage in correspondence with the positions of cursors in the text displayed on the editing display device, whereby the original position as well as the masking position can be determined accurately to facilitate the original positioning procedure and the masking operation. In the case of the exemplary embodiment described above, it has been assumed that two cursors $M_1$ and $M_2$ are employed. It should, however, be understood that the invention need not be restricted to such an arrangement but can be applied to the case where more than two cursors are used.

On the other hand, it is intended that the cursor may be generated by output signals based on the movement of the sliders $SL_1$ and $SL_2$ along the display device.

Figure 2:
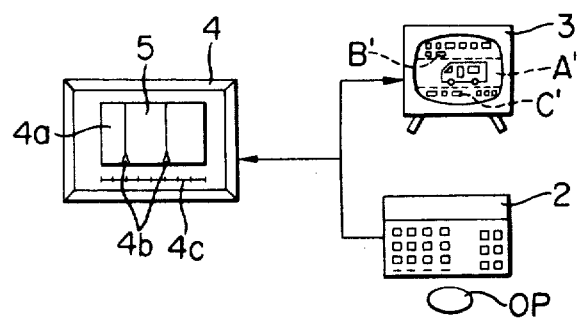
FIG. 2 shows a system for editing recording text for recording a composite information image.
Figure 3:
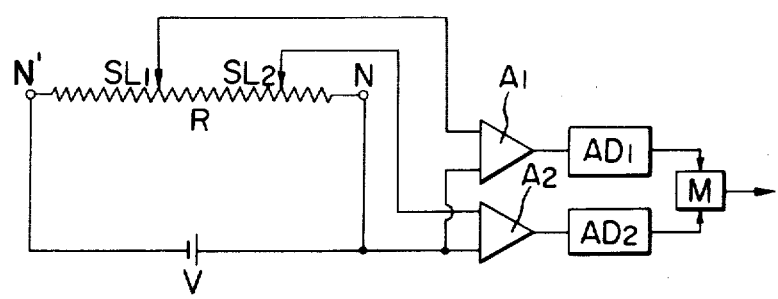
FIG. 3 shows a typical electric circuit suited for carrying out the invention.
Figure 4:
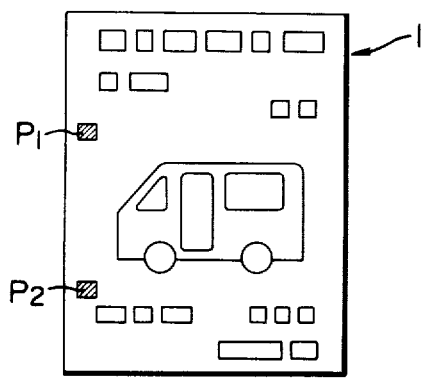
FIG. 4 shows an embodiment for representation by a method according to the present invention.
Figure 5:
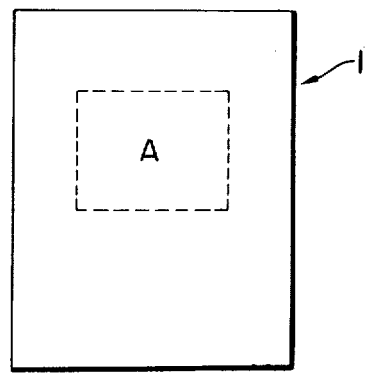
FIG. 5 shows another example of the composite information image to which the invention can be applied.
Figure 6:
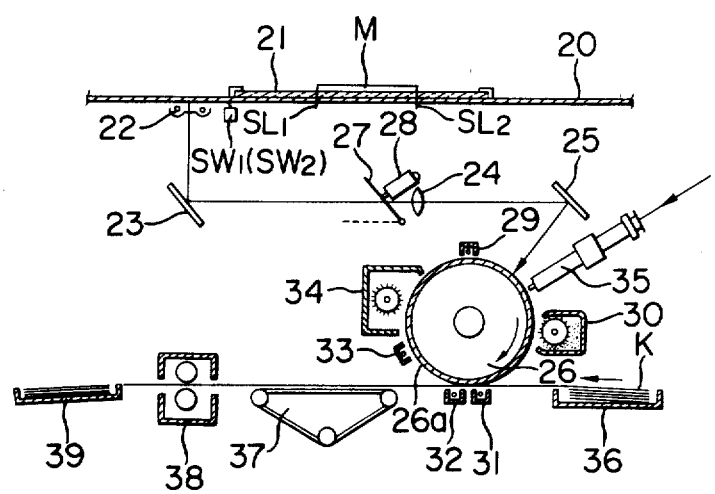
FIG. 6 shows schematically a general arrangement of a composite information recording apparatus.

FIG. 3 is a circuit diagram showing an electric circuit arrangement. There are provided at a side of an original carriage two wipers or sliders $SL_1$ and $SL_2$ which may be selectively positioned with a distance therebetween corresponding to the width of an original on the copy board 4a and which are in slidable contact with a resistor R of a composite information recording apparatus 4. Since the resistor R is connected in series to a power supply source V, a voltage appearing across the slider $SL_1$ and one end N' of the resistor R provides a positional information signal which is representative of the position of one edge of the original and applied to the input of an operational amplifier $A_1$. On the other hand, the voltage appearing across the slider $SL_2$ and the other end N of the resistor R constitutes a positional information signal which represents the position of the other edge of the original and is applied to another amplifier $A_2$. The output signals from the amplifiers $A_1$ and $A_2$ are supplied to analog-to-digital or A/D converters $AD_1$ and $AD_2$, respectively, to be converted into corresponding digital quantities. The digital quantities output from the A/D converters $AD_1$ and $AD_2$ thus represent the width of the original. The two digital quantities thus obtained are supplied to a multiplexer M to be processed so that they are displayed on a display device 3 as boundaries $P_1$ and $P_2$ defining a region of the original as illustrated in FIG. 4 together with other information such as characters after editing processing. As a method of displaying an area A' (FIG. 2) on the display device, a system for displaying the area by using a single point in place of the system illustrated in FIG. 4 may be utilized. In this case, the operator can not confirm the relative area of the region allotted for the original image. However, there will arise no difficulty in preparing a composite image by displaying an end mark on the display device, since the quantity of information or data which can be recorded is invariable.

Figure 1:
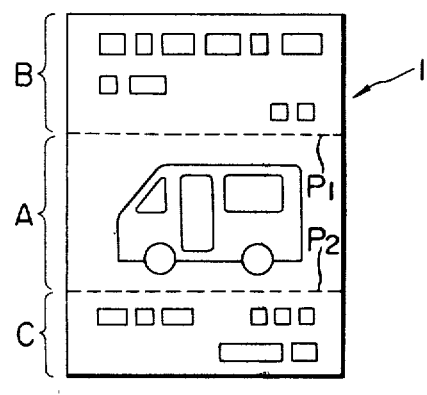
FIG. 1 illustrates schematically an example of a composite information image.

In the case of the example illustrated in FIG. 1, the region for the original image extends over the whole width of the recording sheet. However, even in the case where the area allotted for the original image A has a width shorter than that of the recording sheet 1 to allow external information images to be recorded at both sides of the image area A, the area may be equally displayed on the display device. To this end, two sliders or wiper elements may be slidably disposed at one side and at one end, respectively, of the original carriage of the composite information recording apparatus, whereby the voltages or magnitudes which vary in dependence on the positions of the individual slider or wiper elements are derived and supplied to the multiplexer to be processed for visual display in the manner described above.

As will be appreciated from the foregoing description, this embodiment allows the operator to display the area for an image of an original on a display device through a greatly facilitated procedure upon addition of a text for recording composite image information with extremely enhanced efficiency.

Although the invention has been described in conjunction with preferred exemplary embodiments thereof, it should be mentioned that modifications and variations will readily occur to those skilled in the art without departing from the spirit and scope of the invention.

What is claimed is:

1. In a composite information recording apparatus for recording on a recording sheet a composite image of an original and electric signal information as separate but substantially contiguous portions of the same recording sheet substantially without overlap therebetween, and including a copy board having a portion on which the original is received for electrophotographic copying thereof, data input means for entering variable information into said apparatus for composite recording with an image of the original and for converting said variable information to electric signal information, operable means on the copy board adjacent the original receiving portion thereof for indicating the boundaries of the original so as to facilitate placement of the original on the copy board for predetermined placement thereon with respect to the variable information entered into the apparatus for composite recording with an image of the original, and means for communication between said data input means and said operable means on the copy board for providing an automatic determination of proper and permissible positional correlation between the variable electric signal information and the image of the original for composite recording on the same recording sheet, said operable means comprising at least a row of illuminating elements disposed along an edge of the copy board original receiving portion for providing a visual display of at least a boundary beyond which the original is to be placed on the copy board for reproduction so as to prevent overlapping thereof with variable information previously entered into said apparatus through said data input means.

2. In a composite information recording apparatus according to claim 1, said data input means including a variable information position designating means operable to signify the conclusion of variable information entered for composite recording with the image of the original and for activating at least one of said illuminating elements so as to designate the boundary beyond which the original is to be placed on the copy board for reproduction in contiguous composite relation with the variable information entered through said data input means.

3. In a composite information recording apparatus for recording on a recording sheet a composite image of an original and electric signal information as separate but substantially contiguous portions of the same recording sheet substantially without overlap therebetween, and including a copy board having a portion on which the original is received for electrophotographic copying thereof, data input means for entering variable information into said apparatus for composite recording with an image of the original and for converting said variable information to electric signal information, operable means on the copy board adjacent the original receiving portion thereof for indicating the boundaries of the original so as to facilitate placement of the original on the copy board for predetermined placement thereof with respect to the variable information entered into the apparatus for composite recording with an image of the original, and means for communication between said data input means and said operable means on the copy board for providing an automatic determination of proper and permissible positional correlation between the variable electric signal information and the image of the original for composite recording on the same recording sheet, said operable means comprising position designating means selectively movable along an edge of the copy board original receiving portion to thereby designate at least a boundary of an original placed on the copy board for reproduction in said composite information recording apparatus, and said automatic communication means including means for providing at said data input means a visual positional signal corresponding to the selected position of said position designating means as an indication of the boundary of the original document to be reproduced and to delineate the remaining portion of the recording sheet within which variable information may be provided through said data input means.

4. In a composite information recording apparatus according to claim 3, said position designating means comprising at least a slider selectively movable along said edge of the copy board original receiving portion.

* * * * *